(12) United States Patent
Exall et al.

(10) Patent No.: US 10,120,651 B2
(45) Date of Patent: Nov. 6, 2018

(54) TRAILING OR LEADING DIGIT ANTICIPATOR

(71) Applicant: Imagination Technologies Limited, Kings Langley (GB)

(72) Inventors: Freddie Rupert Exall, West Yorks (GB); Theo Alan Drane, London (GB); Joe Buckingham, Middlesex (GB)

(73) Assignee: Imagination Technologies Limited, Kings Langley (GB)

( * ) Notice: Subject to any disclaimer, the term of this patent is extended or adjusted under 35 U.S.C. 154(b) by 92 days.

(21) Appl. No.: 15/262,168

(22) Filed: Sep. 12, 2016

(65) Prior Publication Data
US 2017/0075658 A1 Mar. 16, 2017

(30) Foreign Application Priority Data
Sep. 10, 2015 (GB) .................. 1516010.4

(51) Int. Cl.
*G06F 7/00* (2006.01)
*G06F 7/74* (2006.01)

(52) U.S. Cl.
CPC ..................... *G06F 7/74* (2013.01)

(58) Field of Classification Search
CPC .......................................... G06F 7/74
USPC ......................................... 708/211
See application file for complete search history.

(56) References Cited

U.S. PATENT DOCUMENTS

| 4,926,369 | A | * | 5/1990 | Hokenek | G06F 5/012 708/205 |
| 5,633,819 | A | | 5/1997 | Brashears et al. | |
| 5,844,826 | A | * | 12/1998 | Nguyen | G06F 7/74 708/211 |
| 6,499,044 | B1 | * | 12/2002 | Brooks | G06F 7/49 708/205 |
| 2003/0140074 | A1 | * | 7/2003 | Hoskote | G06F 7/485 708/211 |

OTHER PUBLICATIONS

Schmookler et al. "Leading Zero Anticipation and Detection—A Comparison of Methods," ARITH '01 Proceedings of the 15th IEEE Symposium on Computer Arithmetic, IEEE Computer Society, Jun. 2001, pp. 7-12.

* cited by examiner

*Primary Examiner* — Tan V. Mai
(74) *Attorney, Agent, or Firm* — Vorys, Sater, Seymour and Pease LLP; Vincent M DeLuca

(57) ABSTRACT

Methods and leading zero anticipators for estimating the number of leading zeros in a result of a fixed point arithmetic operation which is accurate to within one bit for any signed fixed point numbers. The leading zero anticipator includes an input encoding circuit which generates an encoded input string from the fixed point numbers; a window-based surrogate string generation circuit which generates a surrogate string whose leading one is an estimate of the leading one in the result of the arithmetic operation by examining consecutive windows of the encoded input string and setting corresponding bits of the surrogate string based on the examinations; and a counter circuit configured to estimate the number of leading zeros in the result of the arithmetic operation based on the leading one in the surrogate string.

13 Claims, 10 Drawing Sheets $c = c_0 c_1 c_2 c_3 c_4 c_5 c_6 c_7 c_8 c_9 = p\ p\ p\ g\ z\ g\ g\ p\ z\ z$

802

| $i$ | $i^{th}$ Window | $i^{th}$ Pattern | $e\_y(i)$ |
|---|---|---|---|
| 0 | $c_0 c_1 c_2$ | ppp | 0 |
| 1 | $c_1 c_2 c_3$ | ppg | 0 |
| 2 | $c_2 c_3 c_4$ | pgz | 0 |
| 3 | $c_3 c_4 c_5$ | gzg | 1 |
| 4 | $c_4 c_5 c_6$ | zgg | 0 |
| 5 | $c_5 c_6 c_7$ | ggp | 0 |
| 6 | $c_6 c_7 c_8$ | gpz | 1 |
| 7 | $c_7 c_8 c_9$ | pzz | 1 |

$e\_y = 0\ 0\ 0\ 1\ 0\ 0\ 1\ 1$

804

| Window | $e\_y$ |
|---|---|
| ggg | 0 |
| ggp | 0 |
| ggz | 1 |
| gpg | 1 |
| gpp | 1 |
| gpz | 1 |
| gzg | 1 |
| gzp | 0 |
| gzz | 0 |
| pgg | 1 |
| pgp | 0 |
| pgz | 0 |
| ppg | 0 |
| ppp | 0 |
| ppz | 0 |
| pzg | 0 |
| pzp | 0 |
| pzz | 1 |
| zgg | 0 |
| zgp | 0 |
| zgz | 1 |
| zpg | 1 |
| zpp | 1 |
| zpz | 1 |
| zzg | 1 |
| zzp | 0 |
| zzz | 0 |

TRAILING OR LEADING DIGIT ANTICIPATOR

BACKGROUND

There are many situations where it is useful to count the number of consecutive ones or zeros in a binary number starting from the either the left hand side (i.e. starting with the most significant bit (MSB)) or the right hand side (i.e. starting with the least significant bit (LSB)). When counting from the most significant bit, this may be referred to as counting leading ones or zeros (e.g. a binary number 0111 has one leading zero and a binary number 1100 has two leading ones). When counting from the least significant bit this may be referred to as counting trailing ones or zeros (e.g. a binary number 1100 has two trailing zeros and a binary number 1000 has three trailing zeros).

Counting the leading or trailing zeros comprises detecting the first one in the binary number from the MSB or LSB respectively; or in other words, detecting the first transition from a zero to a one from the MSB or LSB. Similarly, counting the leading or trailing ones comprises detecting the first zero in the binary number from the MSB or LSB respectively; or in other words detecting the first transition from a one to a zero from the MSB or LSB.

A leading zero counter (LZC), which counts the number of leading zeros, may, for example, be used for normalization in floating point arithmetic (e.g. floating point addition). It will be appreciated, however, that a trailing zero counter (TZC) which counts the trailing zeros may be used as a leading zero counter, and vice versa, by connecting up the inputs such that the true MSB of the input binary number is connected to the LSB input of the trailing zero counter or the leading zero counter.

The embodiments described below are provided by way of example only and are not limiting of implementations which solve any or all of the disadvantages of known trailing or leading zero anticipators.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Described herein are methods and leading zero anticipators for estimating the number of leading zeros in a result of a fixed point arithmetic operation which is accurate to within one bit for any signed fixed point numbers. The leading zero anticipator comprises an input encoding circuit which generates an encoded input string from the fixed point numbers; a window-based surrogate string generation circuit which generates a surrogate string whose leading one is an estimate of the leading one in the result of the arithmetic operation by examining consecutive windows of the encoded input string and setting corresponding bits of the surrogate string based on the examinations; and a counter circuit configured to estimate the number of leading zeros in the result of the arithmetic operation based on the leading one in the surrogate string.

A first aspect provides a leading zero anticipator configured to estimate a number of leading zeros in a result of an arithmetic operation performed on two or more fixed point numbers, the leading zero anticipator comprising: an input encoding circuit configured to generate an encoded input string from the two or more fixed point numbers; a window-based surrogate string generation circuit configured to generate a surrogate string whose leading one is an estimate of a leading one in the result of the arithmetic operation by examining consecutive windows of the encoded input string and setting corresponding bits of the surrogate string based on the examinations, the estimate of the leading one being within one bit position of the leading one in the actual result of the arithmetic operation for any signed fixed point numbers; and a counter circuit configured to estimate the number of leading zeros in the result of the arithmetic operation based on the leading one in the surrogate string.

A second aspect provides a method of estimating a number of leading zeros in a result of an arithmetic operation performed on two or more fixed point numbers, the method comprising: generating, using an input-encoding circuit, an encoded input string from the two or more fixed point numbers; generating, using a window-based surrogate string generation circuit, a surrogate string whose leading one is an estimate of a leading one in the result of the arithmetic operation by examining consecutive windows of the encoded input string and setting corresponding bits of the surrogate string based on the examinations, the estimate of the leading one being within one bit position of the leading one in the actual result of the arithmetic operation for any signed fixed point numbers; and estimating, using a counter circuit, the number of leading zeros in the result of the arithmetic operation based on the leading one in the surrogate string.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which:

FIG. 9 is a schematic diagram illustrating a comparison of an example output of a fixed point addition circuit and an example surrogate string generated in accordance with the methods of FIGS. 6 and 7.

Figure 1:
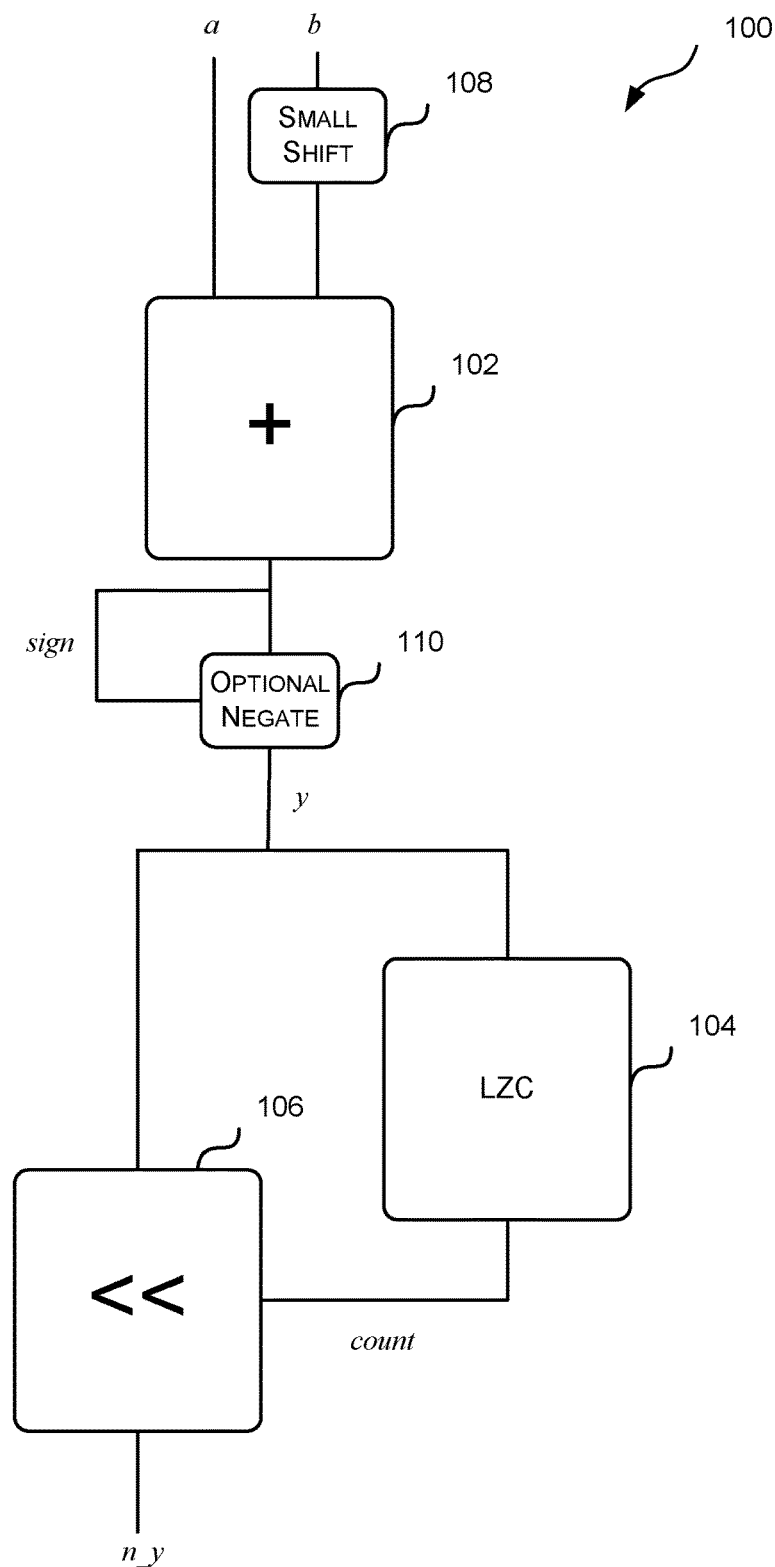
FIG. 1 is a block diagram of an example fixed point addition circuit comprising a leading zero counter.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

As described above, there are many applications where it is useful to know the number of leading or trailing digits (e.g. zeros or ones) in a binary number or string, such as when performing normalization as part of a floating point arithmetic operation, such as a floating point addition operation.

As is known to those skilled in the art a fixed point number representation is a representation of a number that has a fixed number of digits after the radix point (e.g. decimal point or binary point). In contrast, a floating point number representation of a number is a representation of a number where the radix point is not fixed (i.e. it can "float"). In other words the radix point can be placed anywhere within the representation.

The most common floating point format is the Institute of Electrical and Electronics Engineers (IEEE) standard for floating-point arithmetic (IEEE-754). IEEE-754 specifies that floating point numbers are represented by three numbers: sign, exponent and mantissa (s, exp, mant). In general the three numbers (s, exp, mant) are interpreted, for a fixed integer bias, as shown in equation (1):

$$(-1)^s 2^{exp-bias} 1 \cdot \text{mant} \quad (1)$$

Reference is made to FIG. 1 which illustrates an example of a fixed point addition circuit 100 which uses a leading zero counter (LZC) to normalize the result. In particular, the fixed point addition circuit 100 includes addition logic 102 that adds two fixed point inputs, a and b, to produce an output, y. The fixed point addition circuit 100 may form part of a floating point addition circuit. In these cases, the two inputs, a and b, are the mantissae of the two floating point inputs converted into signed fixed point numbers.

Where a and b are similar the output, y, may be small thus a normalization operation is performed via a LZC 104 and a left shift circuit 106 to compensate for the cancelling of any of the leading ones. In particular the LZC 104 counts the number of leading zeros in the output y. The count is provided to the left shift circuit 106 which left shifts the output y to produce a normalized output, n_y.

The fixed point addition circuit 100 may also comprise a small shift circuit 108 which is used to align the inputs a and b and an optional negate circuit 110. If the inputs a and b are negative their addition (once aligned) may produce a negative fixed point result which is negated by the optional negate circuit 110 prior to normalization.

Having the addition logic 102 in series with the LZC 104 means that the left shifting cannot begin until after the addition operation is complete and the leading zeros in the addition output have been counted.

Figure 2:
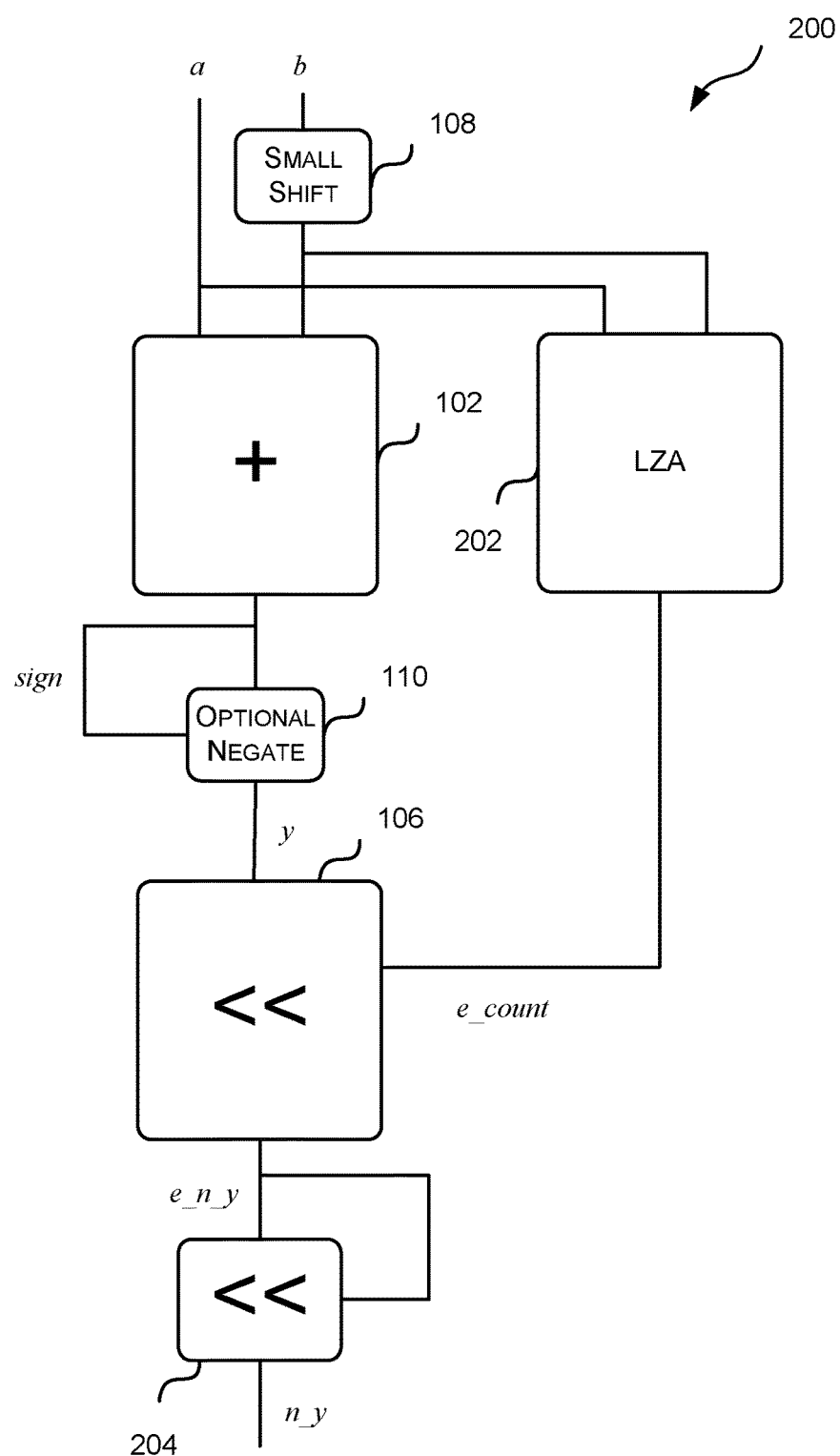
FIG. 2 is a block diagram of an example fixed point addition circuit comprising a leading zero anticipator.

Leading zero anticipators (LZAs) have been developed to estimate the number of leading zeros in the output of a fixed point arithmetic operation (e.g. addition operation) from the inputs so that the number of leading zeros can be estimated in parallel with the arithmetic operation. Reference is now made to FIG. 2 which illustrates an example of a fixed point addition circuit 200 which uses an LZA instead of an LZC to normalize the result. In particular, the fixed point addition circuit 200 comprises the addition logic 102, left shift circuit 106, small shift circuit 108 and optional negate circuit 110 of FIG. 1, however the LZC 104 of FIG. 1 is replaced with a LZA 202.

Since the LZA generates an estimate of the number of leading zeros in the output (e_count) from the aligned and signed inputs, a and b, the LZA 202 can be placed in parallel with the addition logic 102. This means that the LZA 202 does not have access to the output, y, of the addition logic 102 to aide in the estimation. In particular the LZA 202 does not have access to the sign of the output, y, in estimating the number of leading zeros.

Where the LZA 202 can estimate the number of leading zeros in a shorter time than it takes for the addition logic 102 to produce the output, the left shift circuit 106 can start left shifting as soon as the addition logic 102 produces the output, y, reducing the time to produce a normalized output compared to the fixed point addition circuit 100 of FIG. 1. In some cases, the fixed point addition circuit 200 may also comprise a second left shift circuit 204 to perform a small left shift on the estimated normalized output (e_n_y) to account for any error in the estimated count (e_count) generated by the LZA 202. However, the second left shift circuit 204 will typically be faster than an LZC thus the fixed point addition circuit 200 of FIG. 2 will have a shorter critical path than the fixed point addition circuit 100 of FIG. 1 and produce a normalized output faster.

Like the fixed point addition circuit 100 of FIG. 1, the fixed point addition circuit 200 of FIG. 2 may form part of a floating point addition circuit. As described above, in these cases the two inputs, a and b, are the mantissae of the two floating point inputs converted into signed fixed point numbers.

Described herein is an improved LZA which estimates the number of leading zeros in the result or output of a fixed point arithmetic operation performed on any two signed fixed point numbers with an accuracy of one bit. In particular, the improved LZA generates a surrogate string the leading one of which provides an estimate of the leading one in the result of the arithmetic operation by evaluating or analyzing windows of three or more consecutive positions of the fixed point inputs, starting with the MSBs, and setting corresponding bits of the surrogate string based on the analysis; and then determining the number of leading zeros from the estimated position of the leading one indicated by the surrogate string. Specifically the improved LZA determines whether the positions of the inputs in the window comprise a pattern that indicates a leading one in the result or output and if so sets the corresponding bit of the surrogate string to one and otherwise sets the corresponding bit of the surrogate string to zero. In general the $i^{th}$ window is used to determine whether the $i^{th}$ bit of the estimated surrogate string is high or low. In some cases instead of using the fixed point inputs, a and b, directly an encoded input string, c, is generated from the inputs and windows of consecutive positions or letters of the encoded input string are evaluated.

It is noted that the bits and/or positions of strings and numbers are numbered in this document from the most significant bit/position to the least significant bit/position starting with number zero so that the most significant bit/position is the bit/position zero. However, it will be evident to a person of skill in the art that this is simply a mechanism to identify particular bits/positions of a string or number and that the bits/positions could be numbered in another manner without affecting the operation of the techniques and methods described herein. For example, in other cases the bits/positions of a string or number may be numbered from the least significant bit/position to the most significant bit/position.

Figure 3:
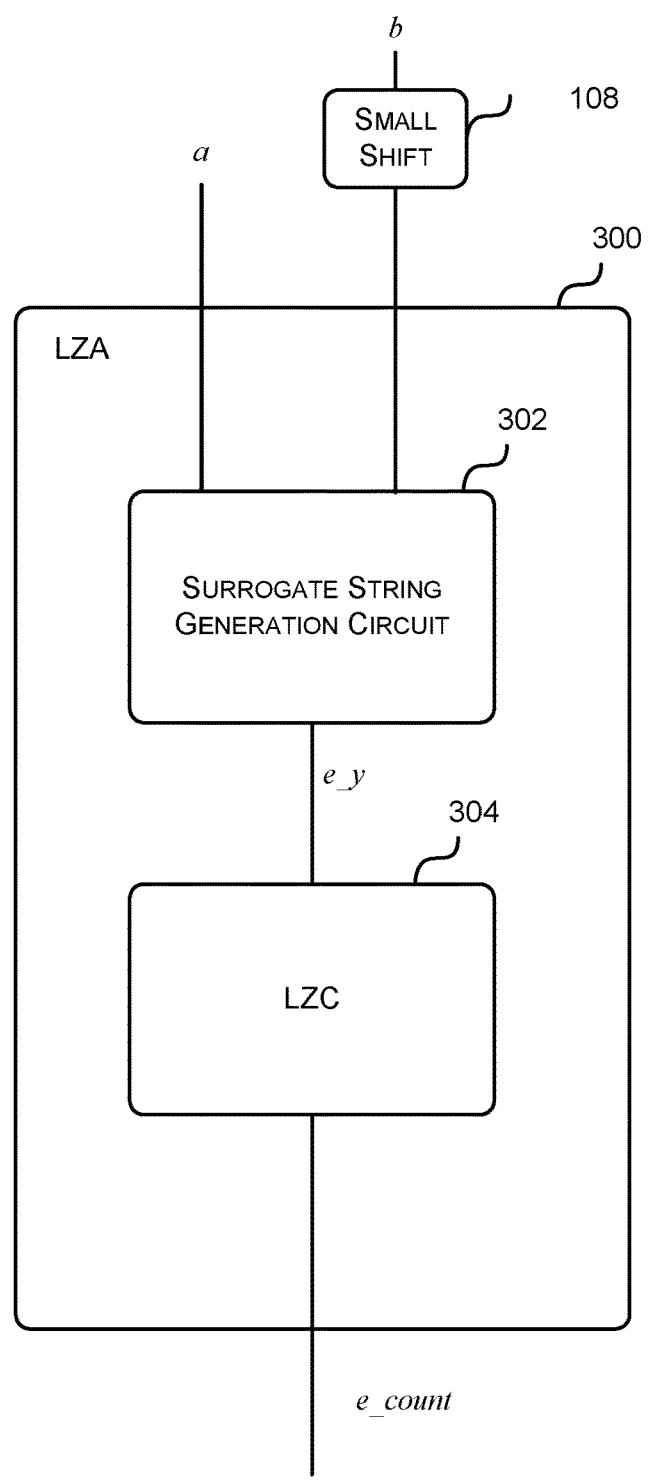
FIG. 3 is a block diagram of an example leading zero anticipator.

Reference is now made to FIG. 3 which illustrates an example implementation of an improved LZA 300. In this example, the LZA 300 comprises a surrogate string generation circuit 302 which generates a surrogate string from the inputs a and b. The leading one of the surrogate string provides an estimate of the leading one in the actual result. The LZA also comprises a LZC 304 which counts the number of zeros in the surrogate string to provide an estimate of the number of leading zeros in the absolute value of the addition of the inputs.

The surrogate string generation circuit 302 is configured to generate a surrogate string of bits, e_y, from the fixed point inputs, a and b, by setting a particular bit of the surrogate string based on a subset or window of bit positions of the inputs a and b. In general the surrogate string generation circuit 302 is configured to generate or set the $i^{th}$ bit of the surrogate string based on the window of the inputs that starts at the $i^{th}$ position of the inputs and ends at the $(i+w-1)^{th}$ position of the inputs where w is the size of the window. For example, when w=3 the $1^{st}$ bit of the surrogate string, e_y, is based on the window of the inputs that starts at the $1^{st}$ position of the inputs and ends at the $3^{rd}$ position. An example surrogate string generation circuit 302 is described with reference to FIG. 4.

The LZC 304 receives the surrogate string, e_y, generated by the surrogate string generation circuit 302 and calculates or counts the number of leading zeros in the surrogate string, e_y. The LZC 304 may be any suitable LZC. The count generated by the LZC 304, e_count, may then be provided to a left shift circuit, such as left shift circuit 106 of FIG. 2, to left shift the actual result or output generated by the fixed point arithmetic circuit.

Figure 4:
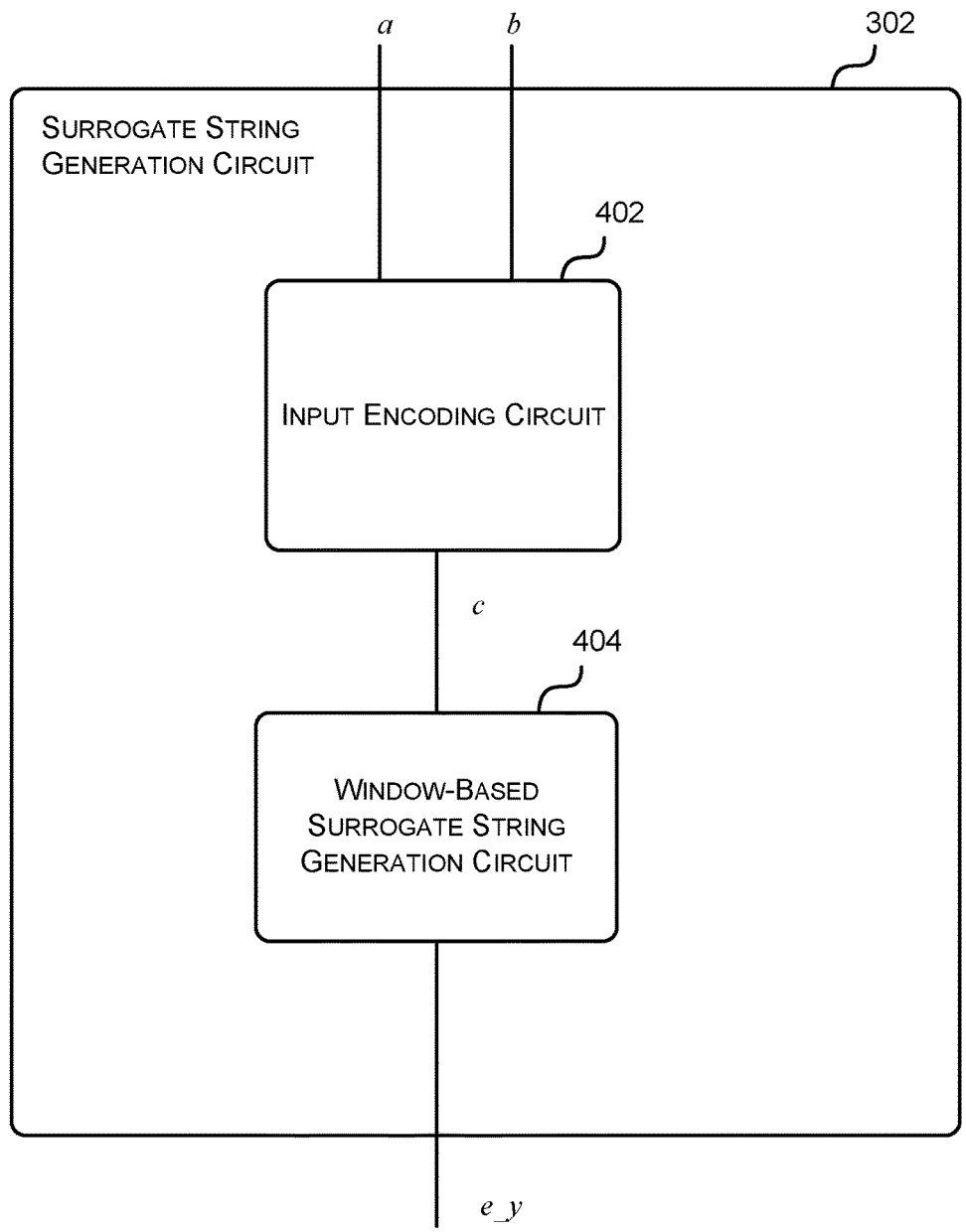
FIG. 4 is a block diagram of an example surrogate string generation circuit of FIG. 3.

Reference is now made to FIG. 4 which illustrates an example implementation of the surrogate string generation circuit 302 of FIG. 3. The example surrogate string generation circuit 302 of FIG. 4 comprises an input encoding circuit 402 configured to generate an encoded input string, c, that represents the two inputs a and b; and a window-based surrogate string generation circuit 404 that that generates the surrogate string, e_y, from the encoded input string c by analyzing windows or subsets of the encoded input string c. As described above the leading zero count of the surrogate string, e_y, provides an estimate of the number of leading zeros in the absolute value of the addition of the inputs a and b.

The input encoding circuit 402 receives the inputs, a and b, and generates an encoded input string c of letters that represents the information in the two fixed point inputs, a and b. In particular, since for addition and subtraction operations it is the number of high bits (i.e. bits set to one) in each bit position that are relevant, the input encoding circuit 402 generates an encoded input string c where the $i^{th}$ position of the string c indicates the number of high bits in the $i^{th}$ bit position of the inputs, a and b. For example, the $7^{th}$ position of string c indicates how many of the $7^{th}$ bit of input a and the $7^{th}$ bit of input b are high (i.e. one).

Where there are two inputs there are only three possible numbers of high bits—zero (the $i^{th}$ bit of both inputs are low); one (the $i^{th}$ bit of one of the inputs is high); or two (the $i^{th}$ bit of both inputs are high). For two inputs, a and b, these possibilities can be represented by a zero function, $z_i$, as shown in equation (2); a propagate function, $p_i$, as shown in equation (3); and a generation function, $g_i$, as shown in equation (4) respectively.

$$z_i=\overline{(a_i \vee b_i)} \qquad (2)$$

$$p_i=a_i \oplus b_i \qquad (3)$$

$$g_i=a_i \wedge b_i \qquad (4)$$

Each position, i, of the encoded input string c is then assigned one of the letters z, p, and g based on which of equations (2), (3) and (4) are high for that position.

In some cases, each of the inputs a and b are presumed to have an additional bit which is set to zero. In these cases, the encoded input string c will have an additional position, relative to the inputs a and b, that is always set to z. For example, if the inputs a and b have eight bits, the encoded input string c will have nine positions. As described below, the $i^{th}$ bit of the surrogate string is generated from the $i^{th}$ window of the encoded input string c which comprises the three consecutive positions of the encoded input string starting with the $i^{th}$ position, therefore adding an additional position to the encoded input string c allows an additional bit of the surrogate string to be generated.

Figure 5:
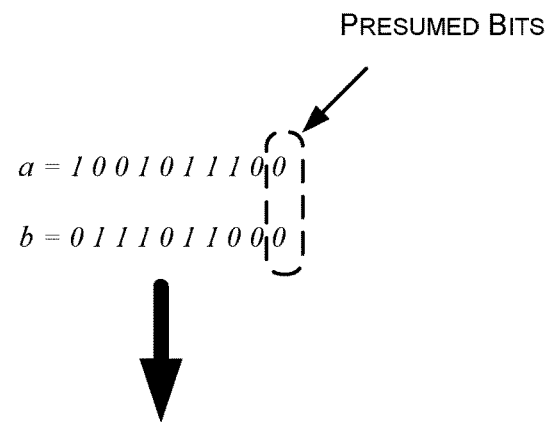
FIG. 5 is a schematic diagram illustrating generation of an example encoded input string from two example binary inputs.

For example, if a=100101110 and b=011101100 the encoded input string c will be pppgzggpzz as shown in Table 1 and FIG. 5.

TABLE 1

| Position i | Input a | Input b | Zero z | Propagate p | Generate g | Encoded Input String c |
|---|---|---|---|---|---|---|
| 0 (MSB) | 1 | 0 | 0 | 1 | 0 | p |
| 1 | 0 | 1 | 0 | 1 | 0 | p |
| 2 | 0 | 1 | 0 | 1 | 0 | p |
| 3 | 1 | 1 | 0 | 0 | 1 | g |
| 4 | 0 | 0 | 1 | 0 | 0 | z |
| 5 | 1 | 1 | 0 | 0 | 1 | g |
| 6 | 1 | 1 | 0 | 0 | 1 | g |
| 7 | 1 | 0 | 0 | 1 | 0 | p |

TABLE 1-continued

| Position i | Input a | Input b | Zero z | Propagate p | Generate g | Encoded Input String c |
|---|---|---|---|---|---|---|
| 8 (LSB) | 0 | 0 | 1 | 0 | 0 | z |
| 9 | 0 (presumed) | 0 (presumed) | 1 | 0 | 0 | z |

Once the encoded input string c has been generated by the input encoding circuit 402 it is provided to the window-based surrogate string generation circuit 404. The window-based surrogate string generation circuit 404 then generates a surrogate string, e_y, by analyzing windows or sub-strings of the encoded input string c. As described above the leading zero count of the surrogate string, e_y, provides an estimate of the leading zero count of the absolute value of the addition of the fixed point inputs a and b.

A window or sub-string of the encoded input string is a consecutive set of positions of the encoded input string c that has fewer positions than the entire encoded input string c (i.e. is a subset of the encoded input string c). For example, for c=pppgzggpz a window or sub-string of size three may comprise any of ppp, ppg, pgz, gzg, zgg, ggp, and gpz.

The window-based surrogate string generation circuit 404 sets the $i^{th}$ bit or position of the surrogate string, e_y, based on the $i^{th}$ window or subset of the encoded input string c. The $i^{th}$ window is considered to be the window that starts at and includes the $i^{th}$ position of the encoded input string c.

In some cases the window-based surrogate string generation circuit 404 is configured to set the $i^{th}$ bit or position of the surrogate string, e_y, high (e.g. to one) if the $i^{th}$ window or subset of the encoded input string c comprises a pattern that is considered to be an anticipator of a leading one in the result or output of the arithmetic operation. In some cases, as described in more detail below, a pattern in the $i^{th}$ window is considered to be an anticipator of a leading one in the result or output of the arithmetic operation if the pattern indicates that the $i^{th}$ or the $i+1^{th}$ position or bit of the result or output of the fixed point arithmetic operation is definitely high (e.g. one). The surrogate string, e_y, may also be referred to herein as the mask or the representative output of the fixed point arithmetic circuit.

For the position of the leading one in the surrogate string to be accurate within one bit or position, a window of size, w, three or greater is used. The window size indicates the number of positions of the encoded input string c that are encompassed or covered by the window. Accordingly a window size of three comprises three positions of the encoded input string c. As described above, since the LZA is intended to be placed in parallel with the fixed point arithmetic circuit (e.g. addition circuit) the sign of the output of the fixed point arithmetic circuit, y, is not available to the LZA to aid in the estimation of the output. This makes it impossible to estimate the position of the leading one with an accuracy of one bit for all possible inputs, a and b, using a window size of two.

For example, Tables 2, 3 and 4 show inputs a and b which produce encoded input strings ppzgg, ppgz and ppzgzp respectively. In Table 2 the window zg does not indicate a leading one. Similarly in Table 3 the window or sub-string gz does not indicate a leading one. However, in Table 4 either the window or sub-string gz or zg must indicate a leading one if the estimate is to be accurate to within one bit. Accordingly, a window of size two cannot predict the leading zero or leading one of the result or output of a fixed point arithmetic operation performed on signed fixed point numbers with an accuracy of one bit.

TABLE 2

| c | = | p | p | z | g | g | g |
|---|---|---|---|---|---|---|---|
| a | = | 1 | 1 | 0 | 1 | 1 | 1 |
| b | = | 0 | 0 | 0 | 1 | 1 | 1 |
| y | = | 1 | 1 | 1 | 1 | 1 | 0 |
| -y | = | 0 | 0 | 0 | 0 | 1 | 0 |

TABLE 3

| c | = | p | p | g | z |
|---|---|---|---|---|---|
| a | = | 1 | 1 | 1 | 0 |
| b | = | 0 | 0 | 1 | 0 |
| y | = | 0 | 0 | 0 | 0 |
| -y | = | 0 | 0 | 0 | 0 |

TABLE 4

| c | = | p | p | z | g | z | p |
|---|---|---|---|---|---|---|---|
| a | = | 1 | 1 | 0 | 1 | 0 | 1 |
| b | = | 0 | 0 | 0 | 1 | 0 | 0 |
| y | = | 1 | 1 | 1 | 0 | 0 | 1 |
| -y | = | 0 | 0 | 0 | 1 | 1 | 1 |

However a window of at least three positions or letters can be used achieve an estimate of the position of the leading one in the output of a fixed point arithmetic operation performed on two signed fixed point numbers that is accurate to one bit (i.e. the estimated position of the leading one differs from the actual position of the leading one by a maximum of one bit). Since it is advantageous to evaluate the smallest number of positions or letters, a window of size three will be described herein, but it will be evident to a person of skill in the art that the principles and techniques described herein may be extended to windows with a size greater than three.

Each window of the encoded input string, c, starting from the MSB, is evaluated in turn to determine whether the pattern or sub-string of letters anticipates a leading one. For example, if the two inputs, a and b, produce an encoded input string $c=p_0p_1z_2z_3g_4g_5$ . . . and w=3 then the first window evaluated (the $0^{th}$ window) comprises $p_0p_1p_2$, the second window evaluated (the $1^{st}$ window) comprises $p_1p_2z_3$, the third window evaluated (the $2^{nd}$ window) comprises $p_2z_3g_4$ and so on. If the pattern or sub-string of letters of the encoded input string in the $i^{th}$ window is considered to anticipate a leading one in the result then the $i^{th}$ bit of the surrogate string, e_y, is set high (e.g. to one); otherwise the $i^{th}$ bit of the surrogate string is set low (e.g. to zero).

To determine whether a particular pattern or sub-string of the encoded input string c in the $i^{th}$ window anticipates a leading one in the result of the fixed point arithmetic operation a determination is made whether the particular pattern of letters in the window will result in a high bit in the $i^{th}$ or $i+1^{th}$ bit of the result or output of the arithmetic operation.

For a fixed point addition operation the determination of whether a particular pattern or sub-string anticipates a leading one on the result can be made based on whether the sum for the pattern of letters in the window will have a high bit in one of the first two positions and whether the result of the sum plus a carry (i.e. sum+1) will have a high bit in one of the first two positions (since a summation of previous bits can produce a carry). Only if both the sum and the sum plus a carry (i.e. sum+1) for a particular combination or pattern of letters (e.g. g, p and z) (referred to as a sub-string) produce a result with a high bit in one of the first two positions (but not both) can it be said with certainty that the particular combination of g, p and z (i.e. sub-string) indicates that a leading one is anticipated or expected in one of the first two positions. Table 5 shows the resulting sum and sum plus carry (i.e. sum+1) for each possible pattern or combination of g, p and z.

TABLE 5

| Window | Sum | High Bit in One of First Two Positions | Sum + 1 | High Bit in One of First Two Positions | Ambiguous Window |
|---|---|---|---|---|---|
| ggg | 110 | No | 111 | No | |
| ggp | 101 | Yes | 110 | No | Yes |
| ggz | 100 | Yes | 101 | Yes | |
| gpg | 010 | Yes | 101 | Yes | |
| gpp | 011 | Yes | 100 | Yes | |
| gpz | 010 | Yes | 011 | Yes | |
| gzg | 010 | Yes | 011 | Yes | |
| gzp | 001 | No | 011 | Yes | Yes |
| gzz | 000 | No | 001 | No | |
| pgg | 010 | Yes | 011 | Yes | |
| pgp | 001 | No | 010 | Yes | Yes |
| pgz | 000 | No | 001 | No | |
| ppg | 000 | No | 001 | No | |
| ppp | 111 | No | 000 | No | |
| ppz | 110 | No | 111 | No | |
| pzg | 110 | No | 111 | No | |
| pzp | 101 | Yes | 110 | No | Yes |
| pzz | 100 | Yes | 101 | Yes | |
| zgg | 110 | No | 111 | No | |
| zgp | 101 | Yes | 110 | No | Yes |
| zgz | 100 | Yes | 101 | Yes | |
| zpg | 100 | Yes | 101 | Yes | |
| zpp | 011 | Yes | 100 | Yes | |
| zpz | 010 | Yes | 011 | Yes | |
| zzg | 010 | Yes | 011 | Yes | |

TABLE 5-continued

| Window | Sum | High Bit in One of First Two Positions | Sum + 1 | High Bit in One of First Two Positions | Ambiguous Window |
|---|---|---|---|---|---|
| zzp | 001 | No | 011 | Yes | Yes |
| zzz | 000 | No | 001 | No | |

It can be seen from Table 5 that the majority of patterns or combinations of g, p and z (i.e. sub-strings) produce consistent results—i.e. both the sum and the sum plus carry (i.e. sum+1) have a one in one of the first two positions, or both the sum and the sum plus carry (i.e. sum+1) do not have a one in one of the first two positions. For these combinations of g, p and z it is evident whether they indicate a leading one or not. However, there are a number of patterns or combinations of g, p and z that do not produce consistent results—i.e. only one of the sum and the sum plus carry (i.e. sum+1) have a one in one of the first two positions. In particular in can be seen in Table 5 that the following combinations of g, p and z (i.e. sub-strings) produce an inconsistent result: ggp, gzp, pgp, pzp, zgp, and zzp. These will be referred to herein as the ambiguous combinations or sub-strings and are summarized in Table 6.

TABLE 6

| Window | Sum | High Bit in One of First Two Positions | Sum + 1 | High Bit in One of First Two Positions |
|---|---|---|---|---|
| ggp | 101 | Yes | 110 | No |
| gzp | 001 | No | 011 | Yes |
| pgp | 001 | No | 010 | Yes |
| pzp | 101 | Yes | 110 | No |
| zgp | 101 | Yes | 110 | No |
| zzp | 001 | No | 011 | Yes |

Since the ambiguous combinations or sub-strings (i.e. ggp, gzp, pgp, pzp, zgp, and zzp) may produce a leading one in one of the first two positions a concern is that a leading one may be missed (i.e. not correctly identified) if these combinations of g, p and z are treated as not indicating a leading one. However, it can be shown that for each of the ambiguous combinations or sub-strings any one in a result (i.e. sum or sum+1) does not indicate a leading one; or if it does indicate a leading one it will be identified as a leading one by a preceding or following window (and so need not be identified in this particular window). Accordingly the ambiguous combinations or sub-strings in and of themselves are not relevant in identifying the leading one in the result or output of the arithmetic operation.

Specifically, if it is assumed that the inputs are sign extended so that the leading window is one of zzz, ppp or ggg then the combinations following each of these leading windows or subsets will be as shown in Table 7.

TABLE 7

| | Indicates Leading One in first two bits | | Indicates Leading one in first two bits | | Indicates Leading one in first two bits | | Indicates Leading one in first two bits | | |
|---|---|---|---|---|---|---|---|---|---|---|
| zzz | No | zzp | Ambiguous | zpz | Yes | | | | |
| | | | | zpp | Yes | | | | |
| | | | | zpg | Yes | | | | |
| | | zzg | Yes | | | | | | |
| ppp | No | ppz | No | pzz | Yes | | | | |
| | | | | pzp | Ambiguous | zpz | Yes | | |
| | | | | | | zpp | Yes | | |
| | | | | | | zpg | Yes | | |
| | | | | pzg | No | zgz | Yes | | |
| | | | | | | zgp | Ambiguous | gpz | Yes |
| | | | | | | | | gpp | Yes |
| | | | | | | | | gpg | Yes |
| | | | | | | zgg | No | | |
| | | ppg | No | pgz | No | gzz | No | | |
| | | | | | | gzp | Ambiguous | zpz | Yes |
| | | | | | | | | zpp | Yes |
| | | | | | | | | zpg | Yes |
| | | | | | | gzg | Yes | | |
| | | | | pgp | Ambiguous | gpz | Yes | | |
| | | | | | | gpp | Yes | | |
| | | | | | | gpg | Yes | | |
| | | | | pgg | Yes | | | | |
| ggg | No | ggz | Yes | | | | | | |
| | | ggp | Ambiguous | gpz | Yes | | | | |
| | | | | gpp | Yes | | | | |
| | | | | gpg | Yes | | | | |

From Table 5 we can see that none of sub-strings gzp, pgp or zzp produce a result (sum or sum+1) with a one in the first bit. In other words, each of these combinations produces a result (sum or sum+1) with a one in the second bit. Since the second bit is covered by the subsequent window, if the subsequent window indicates a leading one then any leading zero that occurs in a gzp, pgp or zzp combination will be identified in the leading one. From Table 6 it can be seen that the window or subset following a gzp, pgp or zzp will be one of gpx or zpx, where x indicates any of z, p or g. From Tables 4 and 7 it can be seen that gpx and zpx always indicate a leading one. Therefore, any leading one that occurs in a gzp, pgp or zzp combination will be identified by the subsequent window or subset and will not go undetected.

With respect to the ggp sub-string, it cannot be the very first sub-string or window thus it must be preceded by a ggg, a zgg or a pgg. If the ggp is preceded by a pgg then the leading zero will be identified by the preceding pgg combination. If, however, it is preceded by a zgg or a pgg then the preceding position/bit of the output will always be one thus the gpp can only indicate a leading digit if the result is negative. When the result is negative the bits are inverted therefore in this case the leading one would occur in the second bit of the window. Since the subsequent window will be a gpx, where x indicates any of z, p or g, which always indicates a leading one any leading one that occurs in a ggp combination that follows a zgg or a pgg sub-string will be identified by the subsequent window or subset and will not go undetected. This is illustrated in Table 8.

TABLE 8

| Preceding Window/ Sub- String | Sum | Sum + 1 | Indicates Leading One in first two bits | | Sum | Sum + 1 | Leading One | Following Window/ Sub- String | Indicates Leading One in first two bits |
|---|---|---|---|---|---|---|---|---|---|
| ggg | 110 | 111 | No | ggp | 101 | 110 | Only if result negative | gpz | Yes |
| | | | | | | | | gpp | Yes |
| | | | | | | | | gpg | Yes |

TABLE 8-continued

| Preceding Window/ Sub-String | Sum | Sum + 1 | Indicates Leading One in first two bits | | Sum | Sum + 1 | Leading One | Following Window/ Sub-String | Indicates Leading One in first two bits |
|---|---|---|---|---|---|---|---|---|---|
| zgg | 110 | 111 | No | ggp | 101 | 110 | Only if result negative | gpz gpp gpg | Yes Yes Yes |
| pgg | 010 | 011 | Yes | zzg | 101 | 110 | Irrelevant | | |

With respect to the pzp sub-string, it also cannot be the very first window or sub-string thus the pzp combination must be preceded by a gpz, a ppz or a zpz sub-string. If the pzp is preceded by a gpz or a zpz then a leading zero will be identified by the preceding gpz or zpz combination (see Table 4) and thus the gpz combination is not relevant in detecting the leading one. If, however, the pzp is preceded by a ppz combination the gpz combination will only indicate a leading digit if the result is negative. In this case the relevant bit is in the second bit of the window which will be included in the subsequent window. From Table 6 it can be seen that the subsequent window will be a zpx, where x indicates any of z, p or g, which always indicates a leading one. Therefore, any leading one that occurs in a pzp combination following a ppz combination will be identified by the subsequent window or subset. This is illustrated in Table 9.

TABLE 9

| Preceding Window/ Sub-String | Sum | Sum + 1 | Indicates Leading One in first two bits | | Sum | Sum + 1 | Leading One | Following Window/ Sub-String | Indicates Leading One in first two bits |
|---|---|---|---|---|---|---|---|---|---|
| gpz | 010 | 011 | Yes | pzp | 101 | 110 | Irrelevant | | |
| ppz | 110 | 111 | No | pzp | 101 | 110 | Only if result negative | zpz zpp zpg | Yes Yes Yes |
| zpz | 010 | 011 | Yes | pzp | 101 | 110 | Irrelevant | | |

With respect to zgp, it also cannot be the very first window thus the zgp combination must be preceded by a gzg, a pzg or a zzg combination. If the pzp is preceded by a gzg or a zpz then a leading zero will be identified by the preceding gzg or zzg combination (see Table 4) and the subsequent zgp combination is not relevant. If, however, the zgp pattern is preceded by a pzg combination the zzg combination will only indicate a leading digit if the result is negative. In this case the relevant bit is in the second bit of the window which will be included in the subsequent window. From Table 6 it can be seen that the subsequent window will be a gpx, where x indicates any of z, p or g, which always indicates a leading one. Therefore, any leading one that occurs from a zgp combination following a zzg combination will be identified by the subsequent window or subset. This is illustrated in Table 10.

TABLE 10

| Preceding Window/ Sub-String | Sum | Sum + 1 | Indicates Leading One in first two bits | | Sum | Sum + 1 | Leading One | Following Window/ Sub-String | Indicates Leading One in first two bits |
|---|---|---|---|---|---|---|---|---|---|
| gzg | 010 | 011 | Yes | zgp | 101 | 110 | Irrelevant | | |
| pzg | 110 | 111 | No | zgp | 101 | 110 | Only if result negative | gpz gpp gpg | Yes Yes Yes |
| zzg | 010 | 011 | Yes | zgp | 101 | 110 | Irrelevant | | |

Accordingly, the location of the leading one of the output of the fixed point addition can be anticipated with an accuracy of within one bit for any inputs, a and b, by the window-based surrogate string generation circuit 404, by identifying the location of the first window of the encoded input string c, starting from the MSB, which comprises a pattern that will always produce a one in one of the first two positions of the window in the result. All other patterns or combinations—i.e. those that never produce a one in one of the first two bits, or those that only sometime produce a one in one of the first two bits—are ignored. In particular, the position of the leading one in the result or output of the fixed point addition can be anticipated by the window-based surrogate string generation circuit 404 to within an accuracy of one bit by setting the $i^{th}$ bit of the surrogate string, e_y, high (e.g. one) only when the $i^{th}$ window comprises a combination or pattern of letter which always produces a one in $i^{th}$ bit or the $i+1^{th}$ bit of the result; otherwise setting the $i^{th}$ bit of the surrogate string, e_y, low (e.g. zero). This is illustrated in Table 11 which is referred to herein as a truth table.

TABLE 11

| $i^{th}$ Window | Surrogate String $e\_y_i$ |
|---|---|
| ggg | 0 |
| ggp | 0 |
| ggz | 1 |
| gpg | 1 |
| gpp | 1 |
| gpz | 1 |
| gzg | 1 |
| gzp | 0 |
| gzz | 0 |
| pgg | 1 |
| pgp | 0 |
| pgz | 0 |
| ppg | 0 |
| ppp | 0 |
| ppz | 0 |
| pzg | 0 |
| pzp | 0 |
| pzz | 1 |
| zgg | 0 |
| zgp | 0 |
| zgz | 1 |
| zpg | 1 |
| zpp | 1 |
| zpz | 1 |
| zzg | 1 |
| zzp | 0 |
| zzz | 0 |

In some cases, the bits/positions of the surrogate string may be identified or determined serially (e.g. the $0^{th}$ bit/position of the surrogate string is determined; then the $1^{st}$ bit/position of the surrogate string is determined; and so on). In these cases once a bit/position of the surrogate string has been set high then no further bits need to be determined. In other cases, the bits of the surrogate string may be identified or determined in parallel to increase the speed of the LZA.

Equation (5) describes a formula for determining the $i^{th}$ bit of the surrogate string, e_y, according to Table 11 when the $0^{th}$ bit is the most significant bit, which may be implemented by the window-based surrogate string generation circuit 404:

$$e\_y_i = (\overline{p}_i \wedge (p_{i+1} \vee (g_{i+1} \wedge z_{i+2}) \vee (z_{i+1} \wedge g_{i+2}))) \vee (p_i \wedge ((z_{i+1} \wedge z_{i+2}) \vee (g_{i+1} \wedge g_{i+2}))) \quad (5)$$

Where the $0^{th}$ bit is the least significant bit then equation (5) may be re-written as equation (6):

$$e\_y_i = (\overline{p}_i \wedge (p_{i-1} \vee (g_{i-1} \wedge z_{i-2}) \vee (z_{i-1} \wedge g_{i-2}))) \vee (p_i \wedge ((z_{i-1} \wedge z_{i-2}) \vee (g_{i-1} \wedge g_{i-2}))) \quad (6)$$

Alternatively the surrogate string, e_y, may be inverted to count the leading ones instead of the leading zeros as show in equation (7):

$$\overline{e\_y_i} = (\overline{p}_i \wedge ((z_{i+1} \wedge \overline{g_{i+2}}) \vee (g_{i+1} \wedge \overline{z_{i+2}}))) \vee (p_i \wedge ((z_{i+1} \wedge \overline{g_{i+2}}) \vee (g_{i+1} \wedge \overline{z_{i+2}}))) \quad (7)$$

Where the $0^{th}$ bit is the least significant bit equation (7) may be written as equation (8):

$$\overline{e\_y_i} = (\overline{p}_i \wedge ((z_{i-1} \wedge \overline{g_{i-2}}) \vee (g_{i-1} \wedge \overline{z_{i-2}}))) \vee (p_i \wedge ((z_{i-1} \wedge \overline{g_{i-2}}) \vee (g_{i-1} \wedge \overline{z_{i-2}}))) \quad (8)$$

It will be evident to a person of skill in the art that these are examples only and that other formulas and equations may be used to implement the truth table set out in Table 11. For example, the equations (5), (6), (7) and/or (8) may be expanded and factored in a variety of ways.

Figure 6:
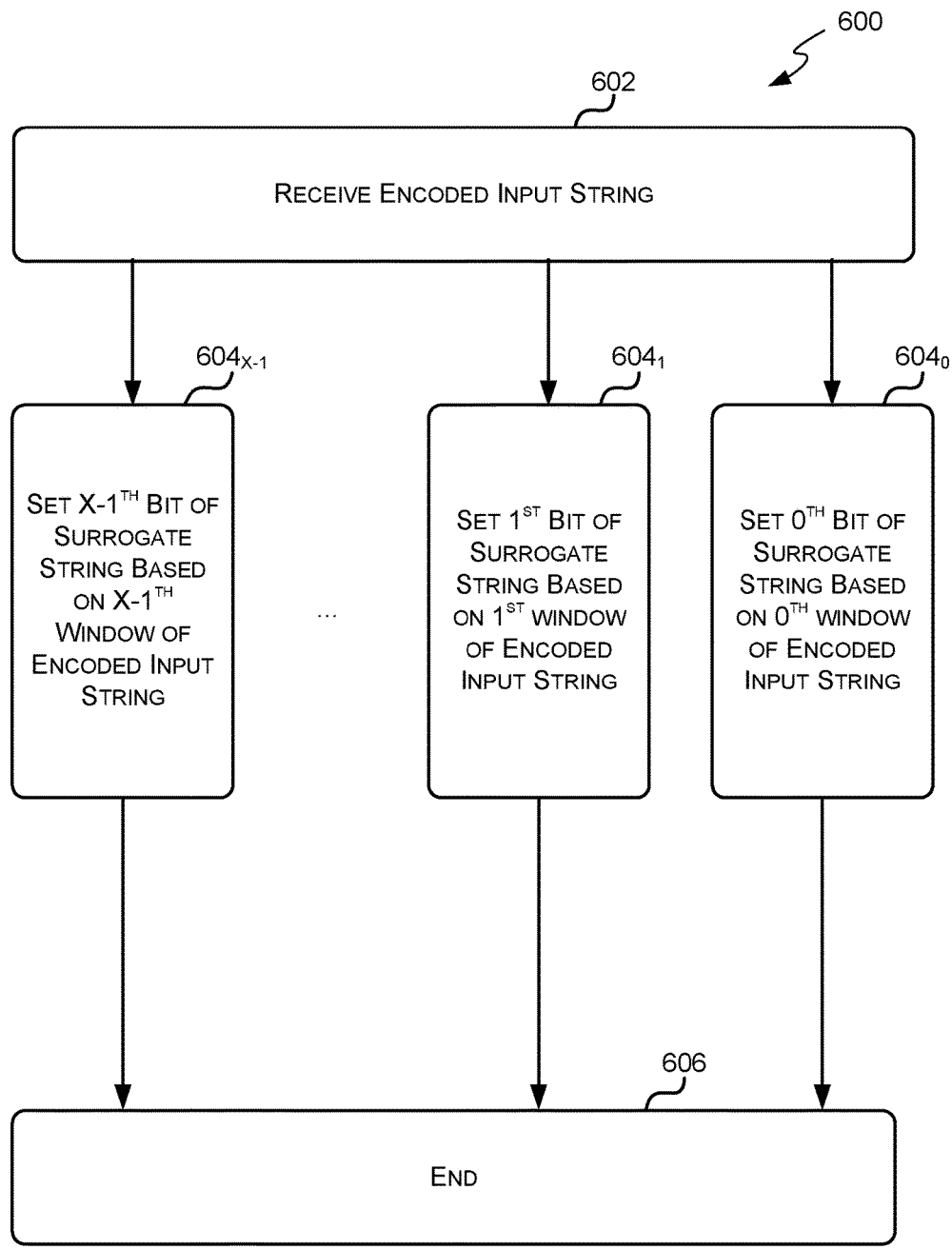
FIG. 6 is a flow diagram of an example method for generating the surrogate string of FIG. 4.
Figure 7:
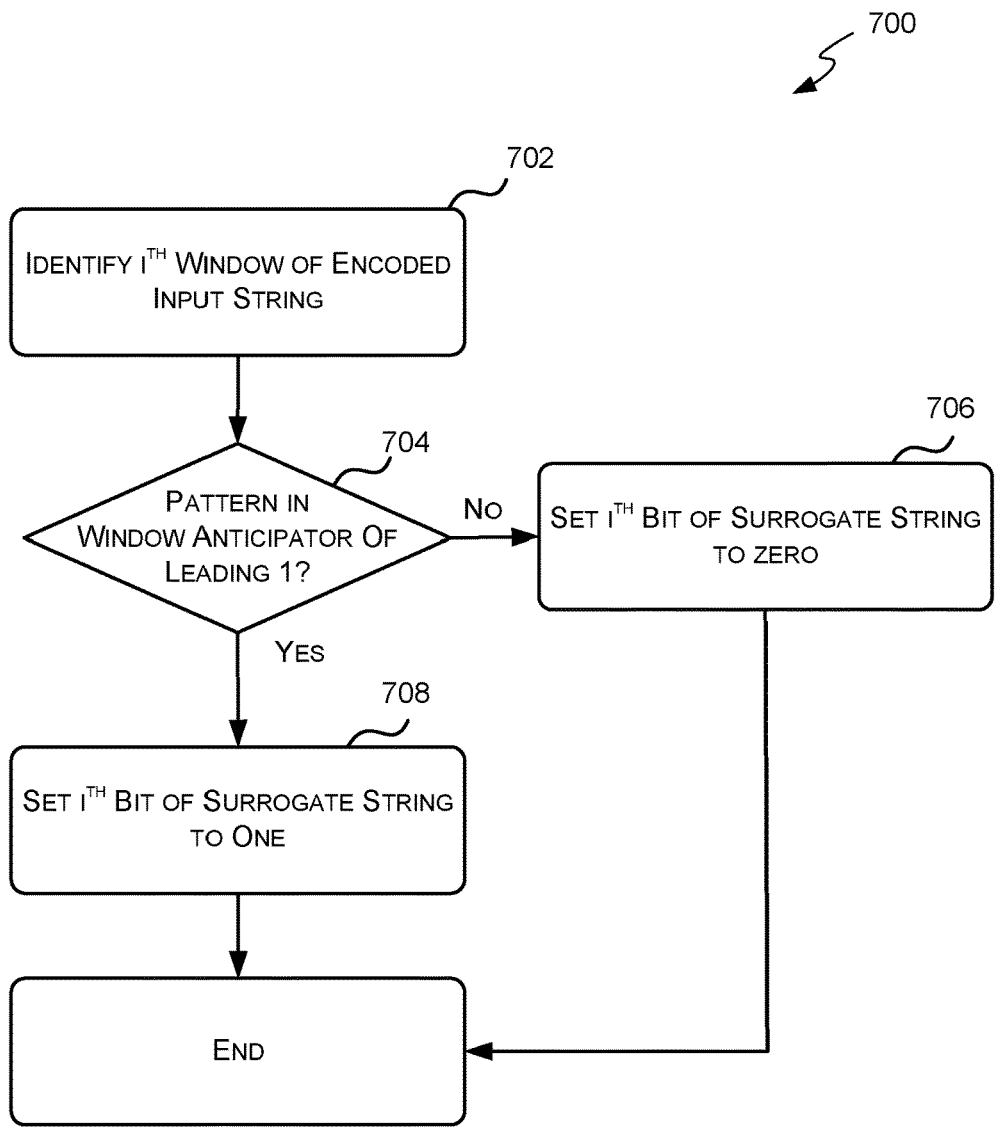
FIG. 7 is a flow diagram of an example method for setting the $i^{th}$ bit of the surrogate string.
Figure 8:
FIG. 8 is a schematic diagram illustrating generation of an example surrogate string in accordance with the methods of FIGS. 6 and 7.
Figure 8:

Reference is now made to FIGS. 6, 7 and 8 which illustrate an example method for generating a surrogate string which may be executed or implemented by the window-based surrogate string generation circuit 404. In particular, FIG. 6 illustrates a flow chart of an example method 600 for generating a surrogate string; FIG. 7 illustrates an example method for generating or setting the $i^{th}$ bit of the surrogate string; and FIG. 8 illustrates how a surrogate string is generated for an example encoded input string, c, using the methods 600 and 700 of FIGS. 6 and 7 respectively.

The method 600 begins at block 602 where the window-based surrogate string generation circuit 404 receives the encoded input string c. For example, as shown in FIG. 8, the window-based surrogate string generation circuit 404 may receive an encoded input string c=pppgzggpzz. Once the encoded input string c is received the method 600 proceeds to blocks 604₀ to 604ₓ₋₁ where X is the number of bits in the inputs a and b less 1. For example if there are 8 bits in the inputs a and b then X is equal to 8−1=7. Each block 604, sets the $i^{th}$ bit of the surrogate string based on the $i^{th}$ window of the encoded input string c. For example, block 604₀ sets the $0^{th}$ bit of the surrogate string based on the $0^{th}$ window of the encoded input string c. An example method for setting the $i^{th}$ bit of the surrogate string will be described below with reference to FIG. 7. Once the bits/positions of the surrogate string have been set the method 600 ends 606.

Reference is now made to FIG. 7 which illustrates a method 700 for setting the $i^{th}$ bit of the surrogate string. The method 700 may be executed at any and/or all of blocks 604₀ to 604ₓ₋₁ of method 600. The method 700 begins at block 702, where the window-based surrogate string generation circuit 404 identifies the $i^{th}$ window of the encoded input string c. As described above the $i^{th}$ window of the encoded input string comprises or encompasses the $i^{th}$ position of the encoded input string to the $(i+w-1)^{th}$ position of the encoded input string c inclusive, where w is the size of the window. For example, if the positions of the encoded input string are numbered from 0 to n, where the $0^{th}$ position is the most significant position and n is the number of positions of the encoded input string, then the $i^{th}$ window includes the positions $c_i \ldots c_{i+w-1}$. For example, where i=0 and w=3 the $0^{th}$ window includes the positions $c_0\ c_1\ c_2$.

Where the encoded input string is pppgzggpzz as shown in FIG. 8 then as shown in table 802 of FIG. 8 the $0^{th}$ window comprises ppp; the $1^{st}$ window comprises ppg; the $2^{nd}$ window comprises pgz; and so on.

Once the $i^{th}$ window has been identified the method 700 proceeds to block 704.

At block 704 the window-based surrogate string generation circuit 404 determines whether the pattern of letters in the $i^{th}$ window identified in block 702 is an anticipator of a leading zero in the result or output of the arithmetic operation. The window-based surrogate string generation circuit 404 may determine whether the pattern indicates that it is an anticipator of a leading zero in accordance with a truth table. For example, the window-based surrogate string generation circuit 404 may implement the truth table of Table 11 in hardware logic. A copy of Table 11 is shown in FIG. 8 as table 804.

As described above, the truth table of Table 11 only considers a pattern in the $i^{th}$ window an anticipator of a leading one in the result or output of the arithmetic operation if the pattern will always produce a one in the $i^{th}$ bit or $i+1^{th}$ bit (but not both) of the result or output of the arithmetic operation. Using the truth table of Table 11 allows the position of the leading one in the result of the output of the arithmetic operation to be estimated with a one bit accuracy for any two signed fixed point numbers.

If is determined that the pattern in the $i^{th}$ window is not an anticipator of a leading one in the result or output of the arithmetic operation then the method 700 proceeds to block 706. If, however, it is determined that the pattern in the $i^{th}$ window is an anticipator of a leading one in the result or output of the arithmetic operation then the method 700 proceeds to block 708.

At block 706, the $i^{th}$ bit/position of the surrogate string is set to zero to indicate that the $i^{th}$ bit of the output is not estimated to be the position of the leading zero. For example, as shown in FIG. 8 if the $0^{th}$ window comprises ppp and the truth table of Table 11 (e.g. table 804) is used then the pattern (ppp) is not an anticipator of a leading one. Accordingly the 0th bit of the surrogate string (e_$y_0$) is set to zero. Once the $i^{th}$ bit of the surrogate string has been set to zero the method 700 ends.

At block 708 the $i^{th}$ bit/position of the surrogate string is set to one indicating that the $i^{th}$ position of the result or output of the arithmetic operation is estimated to be a one. For example, in FIG. 8 the $3^{rd}$ window comprises the pattern gzg which according to the truth table of FIG. 11 (e.g. table 804) is an anticipating pattern thus the $3^{rd}$ bit of the surrogate string (e_$y_3$) is set to one to indicate that it estimates that the $3^{rd}$ bit/position of the result or output of the arithmetic operation will comprise a one. Once the $i^{th}$ bit of the surrogate string has been set to one then the method 700 ends.

Reference is now made to FIG. 9 which illustrates an example of the output and the corresponding surrogate string generated in accordance with the methods describe herein for an example set of inputs a and b. In this example, the two inputs a and b are 100101110 and 011101100 respectively which, as shown in FIG. 5, results in an encoded input string of pppgzggpzz. As shown in FIG. 8 this results in a surrogate string, e_y, of 00010011 which has three leading zeros (i.e. the leading one is anticipated or estimated to be the fourth bit from the left). The absolute value of the addition of a and b is 000011010 which has four leading zeros (i.e. the leading one is in the fifth bit from the left). Accordingly the estimated position of the leading one is off by one bit which is within the accepted tolerance.

Figure 10:
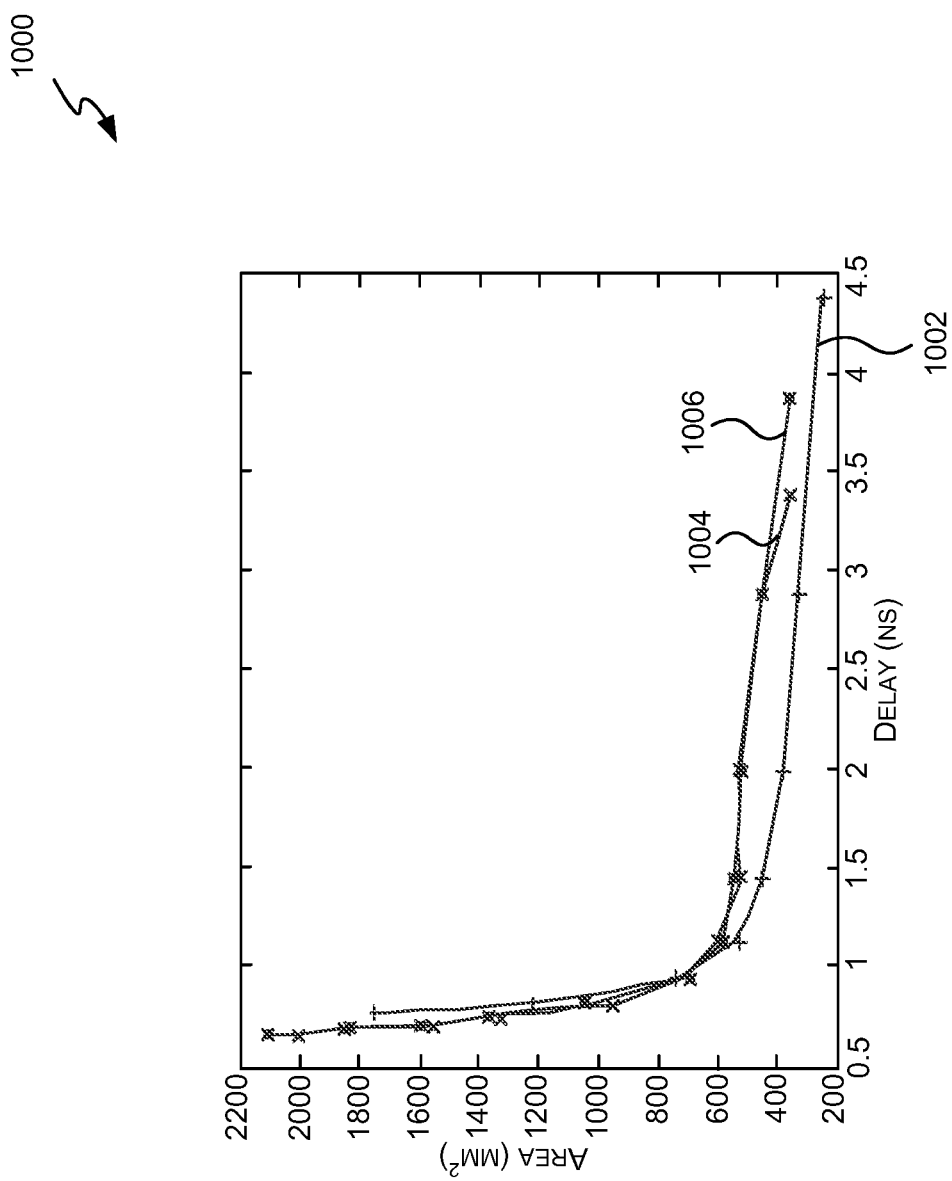
FIG. 10 is a graph showing the area versus delay trade-off for different single precision floating point addition circuits comprising the fixed point addition circuits described herein.

Reference is now made to FIG. 10 which illustrates a graph 1000 that shows the performance improvements in a floating point addition circuit that includes a fixed point addition circuit 200 that uses a LZA with a window-based surrogate generation circuit that implements equation (5) or (7) compared to a floating point addition circuit that includes a fixed point addition circuit 100 that uses a LZC. In particular graph 1000 shows the area of the floating point addition circuit compared to convergence time in nanoseconds (i.e. the time for the floating point result or output to be produced).

Curve 1002 shows the area and convergence time of a single precision floating point addition circuit which includes the fixed point addition circuit 100 of FIG. 1 that uses an LZC; curve 1004 shows the area and convergence time of a single precision floating point addition circuit that includes the fixed point addition circuit 200 of FIG. 2 with an LZA that has a window-based surrogate string generation circuit that implements equation (5); and curve 1006 shows the area and convergence time of a single precision floating point addition circuit that includes the fixed point addition circuit 200 of FIG. 2 with an LZA that has a window-based surrogate string generation circuit 404 that implements equation (7).

Accordingly, the fixed point addition circuit 200 with an LZA that has a window-based surrogate string generation circuit 404, whether implementing equation (5), or equation (7) produces a floating point addition circuit that is 15% quicker than a traditional floating point addition circuit that uses a fixed point addition circuit 100 with an LZC. However, this comes at the expense of additional area to implement the circuit. Accordingly, the methods and principles describe herein may be particularly suited to timing critical applications.

The term 'processor' and 'computer' are used herein to refer to any device, or portion thereof, with processing capability such that it can execute instructions. The term 'processor' may, for example, include central processing units (CPUs), graphics processing units (GPUs or VPUs), physics processing units (PPUs), radio processing units (RPUs), digital signal processors (DSPs), general purpose processors (e.g. a general purpose GPU), microprocessors, any processing unit which is designed to accelerate tasks outside of a CPU, etc. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

It is also intended to encompass software which "describes" or defines the configuration of hardware that implements a module, functionality, component or logic described above, such as HDL (hardware description language) software, as is used for designing integrated circuits, or for configuring programmable chips, to carry out desired functions. That is, there may be provided a computer readable storage medium having encoded thereon computer readable program code for generating a processing unit configured to perform any of the methods described herein, or for generating a processing unit comprising any apparatus described herein. That is, a computer system may be configured to generate a representation of a digital circuit from definitions of circuit elements and data defining rules for combining those circuit elements, wherein a non-transitory computer readable storage medium may have stored thereon processor executable instructions that when executed at such a computer system, cause the computer system to generate a processing unit as described herein. For example, a non-transitory computer readable storage medium may have stored thereon computer readable instructions that, when processed at a computer system for generating a manifestation of an integrated circuit, cause the computer system to generate a manifestation of a leading zero anticipator as described in the examples herein or to generate a manifestation of a leading zero anticipator configured to perform a method as described in the examples herein. The manifestation of a leading zero anticipator could be the leading zero anticipator itself, or a representation of the leading zero anticipator (e.g. a mask) which can be used to generate the leading zero anticipator.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to an item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A leading zero anticipator configured to estimate a number of leading zeros in a result of an arithmetic operation performed on two or more fixed point numbers, the leading zero anticipator comprising:
   an input encoding circuit configured to generate an encoded input string from the two or more fixed point numbers, wherein the input encoding circuit is configured to set an $i^{th}$ position of the encoded input string to one of a z, p or g based on how many of the $i^{th}$ bits of the fixed point numbers are high;
   a window-based surrogate string generation circuit configured to generate a surrogate string whose leading one is an estimate of a leading one in the result of the arithmetic operation by examining consecutive windows of the encoded input string and setting corresponding bits of the surrogate string based on the examinations, the estimate of the leading one being within one bit position of the leading one in the actual result of the arithmetic operation for any signed fixed point numbers, wherein a window of the encoded input string comprises a predetermined number of consecutive positions of the encoded input string, wherein the predetermined number is greater than or equal to three and wherein the window-based surrogate string generation circuit is configured to generate an $i^{th}$ bit of the surrogate string based on an $i^{th}$ window of the encoded input string, the $i^{th}$ window comprising the predetermined number of consecutive positions of the encoded input string starting with and including an $i^{th}$ position of the encoded input string; and a counter circuit configured to estimate the number of leading zeros in the result of the arithmetic operation based on the leading one in the surrogate string.

2. The leading zero anticipator of claim 1, wherein the window-based surrogate string generation circuit is configured to set an $i^{th}$ bit of the surrogate string to a high value when the corresponding window of the encoded input string comprises a pattern that always indicates one of the $i^{th}$ bit and the $i+1^{th}$ bit of the result of the arithmetic operation will be high.

3. The leading zero anticipator of claim 1, wherein there are two fixed point numbers and the input encoding circuit is configured to: set the $i^{th}$ position of the encoded input string to a z when both of the $i^{th}$ bits of the fixed point numbers are low, set the $i^{th}$ position of the encoded input string to a p when only one of the $i^{th}$ bits of the fixed point numbers is high; and set the $i^{th}$ position of the encoded input string to a g when both of the $i^{th}$ bits of the fixed point numbers are high.

4. The leading zero anticipator of claim 1, wherein a window of the encoded input string comprises three consecutive positions of the encoded input string and the window-based surrogate string generation circuit is configured to set an $i^{th}$ bit of the surrogate string to a high value when the corresponding window of the encoded input string comprises ggz, gpg, GPP, gpp, gpz, gzg, pgg, pzz, zgz, zpg, zpp, zpz or zzg and the window-based surrogate string generation circuit is configured to set the $i^{th}$ bit of the surrogate string to a low value when the corresponding window of the encoded input string comprises ggg, ggp, gzp, gzz, pgp, pgz, ppg, ppp, ppz, pzg, pzp, zgg, zgp, zzp, or zzz.

5. The leading zero anticipator of claim 1, wherein the window-based surrogate string generation circuit is configured to set the $i^{th}$ bit of the surrogate string, e_y, according to the following formula:

$$e\_y_i = (\overline{p}_i \wedge (p_{i-1} \vee (g_{i-1} \wedge z_{i-2}) \vee (z_{i-1} \wedge g_{i-2}))) \vee (p_i \wedge ((z_{i-1} \wedge z_{i-2}) \vee (g_{i-1} \wedge g_{i-2}))).$$

6. The leading zero anticipator of claim 1, wherein the window-based surrogate string generation circuit is configured to set the $i^{th}$ bit of a negated surrogate string, $\overline{e\_y}$, according to the following formula:

$$\overline{e\_y}_i = (\overline{p}_i \wedge ((z_{i-1} \vee \overline{g_{i-2}}) \vee (g_{i-1} \vee \overline{z_{i-2}}))) \vee (p_i \wedge ((z_{i-1} \vee \overline{g_{i-2}}) \vee (g_{i-1} \wedge \overline{z_{i-2}}))).$$

7. A non-transitory computer readable storage medium having stored thereon a computer readable description of an integrated circuit that, when processed in an integrated circuit manufacturing system, causes the integrated circuit manufacturing system to manufacture the leading zero anticipator as set forth in claim 1.

8. A method of estimating a number of leading zeros in a result of an arithmetic operation performed on two or more fixed point numbers, the method comprising:

generating, using an input-encoding circuit, an encoded input string from the two or more fixed point numbers, wherein generating the encoded input string comprises setting an $i^{th}$ position of the encoded input string to one of z, p or g based on how many of the $i^{th}$ bits of the fixed point numbers are high;

generating, using a window-based surrogate string generation circuit, a surrogate string whose leading one is an estimate of a leading one in the result of the arithmetic operation by examining consecutive windows of the encoded input string and setting corresponding bits of the surrogate string based on the examinations, the estimate of the leading one being within one bit position of the leading one in the actual result of the arithmetic operation for any signed fixed point numbers, wherein a window of the encoded input string comprises a predetermined number of consecutive positions of the encoded input string and the predetermined number is greater than or equal to three and wherein generating the surrogate string comprises setting an $i^{th}$ bit of the surrogate string based on an $i^{th}$ window of the encoded input string, the $i^{th}$ window comprising the predetermined number of consecutive positions of the encoded input string starting with and including an $i^{th}$ position of the encoded input string; and estimating, using a counter circuit, the number of leading zeros in the result of the arithmetic operation based on the leading one in the surrogate string.

9. The method of claim 8, wherein generating the surrogate string comprises setting the $i^{th}$ bit of the surrogate string to a high value when the corresponding window of the encoded input string comprises a pattern that always indicates one of the $i^{th}$ bit and the $i+1^{th}$ bit of the result of the arithmetic operation will be high.

10. The method of claim 8, wherein there are two fixed point numbers and generating the encoded input string comprises: setting the $i^{th}$ position of the encoded input string to a z when both of the $i^{th}$ bits of the fixed point numbers are low; setting the $i^{th}$ position of the encoded input string to a p when only one of the $i^{th}$ bits of the fixed point numbers is high; and setting the $i^{th}$ position of the encoded input string to a g when both of the $i^{th}$ bits of the fixed point numbers are high.

11. The method of claim 8, wherein a window of the encoded input string comprises three consecutive positions of the encoded input string and generating the surrogate string comprises setting an $i^{th}$ bit of the surrogate string to a high value when the corresponding window of the encoded input string comprises ggz, gpg, gpp, gpz, gzg, pgg, pzz, zgz, zpg, zpp, zpz or zzg and setting the $i^{th}$ bit of the surrogate string to a low value when the corresponding window of the encoded input string comprises ggg, ggp, gzp, gzz, pgp, pgz, ppg, ppp, ppz, pzg, pzp, zgg, zgp, zzp, or zzz.

12. The method of claim 8, wherein generating the surrogate string comprises setting an $i^{th}$ bit of the surrogate string, e_y, according to the following formula:

$$e\_y_i = (\overline{p}_i \wedge (p_{i-1} \vee (g_{i-1} \wedge z_{i-2}) \vee (z_{i-1} \wedge g_{i-2}))) \vee (p_i \wedge ((z_{i-1} \wedge z_{i-2}) \vee (g_{i-1} \wedge g_{i-2}))).$$

13. The method of claim 8, wherein generating the surrogate string comprises setting an $i^{th}$ bit of a negated surrogate string, $\overline{e\_y}$, according to the following formula:

$$\overline{e\_y}_i = (\overline{p}_i \wedge ((z_{i-1} \vee \overline{g_{i-2}}) \vee (g_{i-1} \vee \overline{z_{i-2}}))) \vee (p_i \wedge ((z_{i-1} \vee \overline{g_{i-2}}) \vee (g_{i-1} \wedge \overline{z_{i-2}}))).$$

* * * * *